Aug. 28, 1956  F. A. MORRIS  2,761,104
METHOD AND APPARATUS FOR TESTING GAS TUBES
Filed Jan. 3, 1955
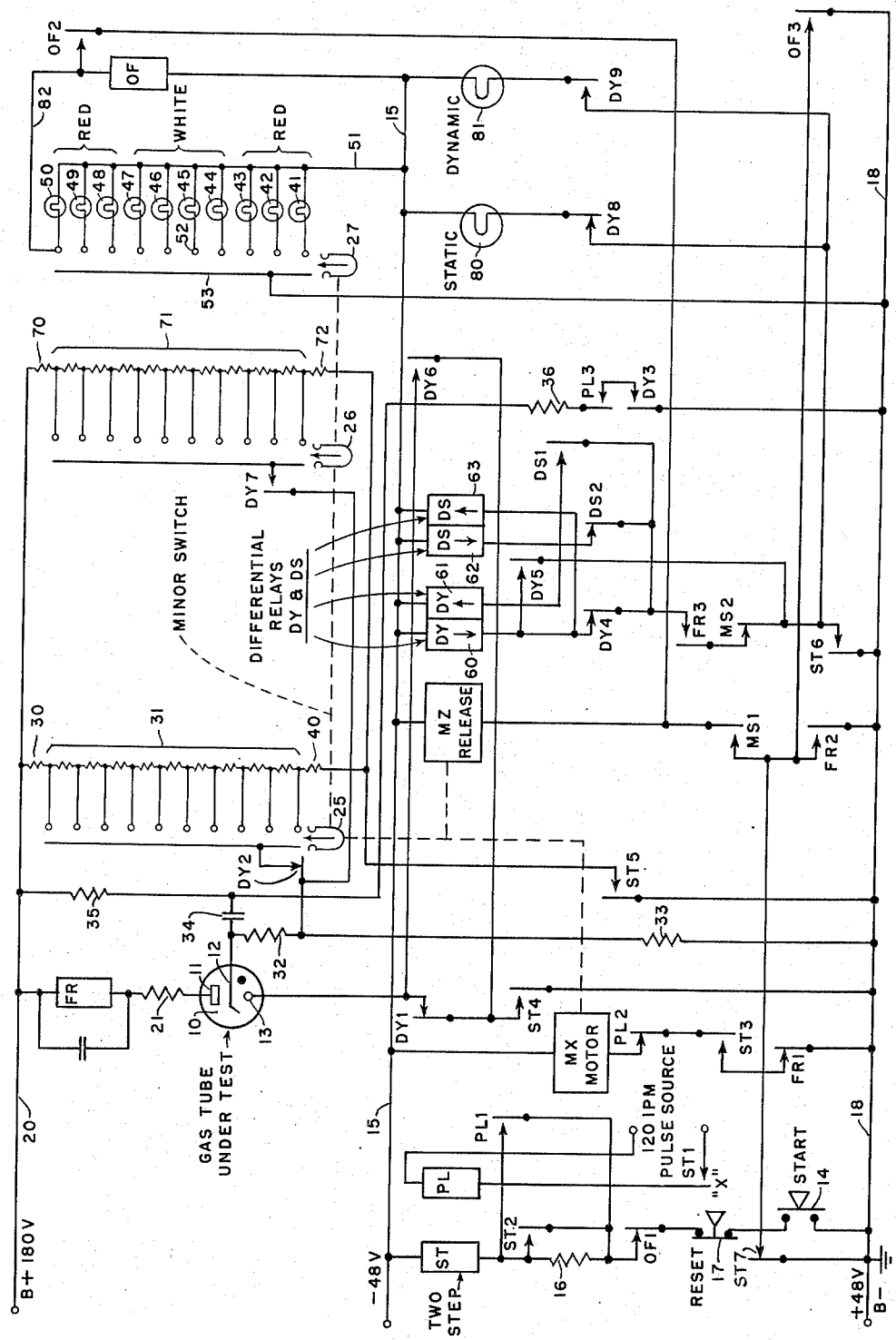

United States Patent Office 2,761,104
Patented Aug. 28, 1956

2,761,104

METHOD AND APPARATUS FOR TESTING GAS TUBES

Frank A. Morris, Rochester, N. Y., assignor, by mesne assignments, to General Dynamics Corporation, a corporation of Delaware Application January 3, 1955, Serial No. 479,352

15 Claims. (Cl. 324—25)

The present invention relates to the testing of multi-electrode gas tubes.

It is a principal object of this invention to provide an improved method and apparatus for testing multi-electrode gas tubes.

Multi-electrode gas tubes of the type having at least anode, starting anode, and cathode electrodes are well known. A characteristic of such tubes is that with a known range of voltage applied between anode and cathode, the tube should not conduct or fire until a so-called firing voltage of at least a minimum value is applied between the starting anode and cathode. However, generally speaking, once the tube has fired to ionize the gas and become conductive, the tube will remain conductive regardless of the subsequent values of the firing voltage so long as the voltage applied between anode and cathode is maintained. Another characteristic of such gas tubes is that the tube, once ionized and conductive, requires a finite interval of time to deionize after the voltage applied between anode and cathode has been removed. Different types of multi-electrode gas tubes have different ratings of operating voltages for both the anode circuit and the firing electrode circuit and also may have different deionization response times. Such tubes of a given type may be considered to be defective and inoperative for certain circuit applications if their operating responses vary from established ranges of operating and firing voltages or deionization response time.

It is therefore an object of this invention to provide an improved method and apparatus for testing the response of a multi-electrode gas tube over a variable range of firing voltages and to also test the deionization response time of the tube.

It has also been found that the multi-electrode gas tubes of the type referred to may have an erratic response to the applied range of firing voltages in that the tube may fire in response to different values of firing voltages during successive ionization and deionization operations. Furthermore, the gas tube response may vary when the applied firing voltage also includes a superimposed pulsing voltage as may be present in certain circuit applications of the tube.

It is another important object of the invention to provide an improved method and apparatus for so-called statically testing the response of the gas tube over different ranges of applied firing voltages, then testing the tube for deionization time, then so-called dynamically testing the response of the tube over different ranges of firing voltages in the presence of a superimposed pulsing voltage and thereafter repeating the deionization test, the static test, the deionization test, the dynamic test and so forth continuously and automatically for as long as desired in the aforesaid sequence to thereby test for erratic tube response.

Further objects, features, and the attending advantages of the invention will be apparent with reference to the following specification and drawing in which the sole figure is a schematic wiring diagram. The drawing is of the detached contact type in which the relays, switch magnets, and contacts appear as nearly as possible in the order of their operation from left to right on the drawing.

According to the invention, a thyratron type of gas tube to be tested is connected in a circuit enabling the following described method steps to be conducted in sequence and repeated in sequence for determining so-called static response characteristics, dynamic response characteristics, deionization response time, and erratic behavior, i. e., consistency of repetition of the previously determined static, dynamic, and deionization response characteristics. A voltage sufficient to maintain the ionization and conductivity of the tube once the tube has been fired, is first connected in the anode circuit in series with the anode and cathode of the gas tube to be tested. Thereafter a progressively increasing voltage, starting with a voltage less than the required firing voltage, is applied in the starting anode circuit in series with the start anode and cathode electrode of the tube. The progressive increase of the firing voltage is continued until the tube fires, while at the same time indicating the relative value of the increasing firing voltage so that the value of the firing voltage at the time that the tube fires will be made known to the test operator. The value of the firing voltage required to fire the tube under test in this instance is an indication of the so-called static response characteristic of the tube. After the tube has fired, the firing voltage is removed and then for a determined short interval of time the voltage applied in the anode circuit of the tube is also removed, and immediately thereafter reapplied. If the tube under test has the correct deionization time response characteristic, the tube will deionize during the brief interval that the voltage for the anode crcuit of the tube is removed. Assuming the deionization test to be successful, a dynamic test is then made by applying a progressively increasing starting voltage again to the starting anode circuit of the tube together with a superimposed pulsing voltage to the starting anode circuit. The value at which the tube fires under such firing voltage condition is then an indication of the so-called dynamic characteristic of the tube. After the tube has fired in response to the dynamic characteristic test, the deionization test is again repeated to allow the tube to deionize within the required deionization interval, following which the static deionization and dynamic tests are again repeated all in the order described above. The repetition of the series of tests on the tube is maintained for a sufficient period of time to assure that the tube consistently responds within the desired ranges of operation and is therefore not erratic in behavior.

In order to automatically apply the series of tests described above and therefore practice the method of the invention, electrical apparatus connected in the circuit of Fig. 1 of the drawing may be used. In the circuit a stepping switch, sometimes referred to as a minor switch having three banks of ten contacts each, is operated to apply the progressively increasing firing voltages alternately for either static or dynamic tests to the starting anode circuit of the gas tube. Each time that the tube fires, the stepping of the switch is stopped and the switch is released to restore to normal, at which time the deionization test is made by momentarily opening the anode circuit of the tube. If the tube deionizes within the required deionization interval, the minor switch is again automatically stepped to apply the other range of increasing firing voltages for the other type of test which alternately may be the static or dynamic test.

In the drawing, the gas tube 10 to be tested is received in a suitable socket (not shown), having the necessary socket contacts for making the required connections to the anode 11, starting anode 12, and cathode electrode 13 of the gas tube. At the beginning of the test, the starting switch 14 is closed to thereby establish a circuit to operate, to its preliminary operated condition only, the two-step starting relay ST from the —48 volt conductor 15, through the relay coil ST, resistance 16, normally closed overflow relay contact OF1, normally closed reset switch 17, and the operated start switch 14 to the +48 volt conductor 18 and ground. In the circuit to be described, the +48 volt conductor 18 is connected to ground, a +48 volt terminal, and a B— terminal of a power supply (not shown), while the —48 volt conductor 15 is connected to the —48 volt terminal of the power supply and the B+ conductor 20 is connected to the +180 volt terminal of the power supply. The aforementioned operation of the start relay ST to only its preliminary make contacts closes the preliminary make X type contacts ST1 which thereby connects the pulsing relay PL in circuit with a suitable 120 impulse per minute pulse voltage source causing the pulsing relay PL to thereafter operate and release 120 times per minute. Upon the first operation of the pulsing relay PL, its PL1 contacts are closed to complete a circuit short-circuiting the resistor 16 and thus fully operating the two-step start relay ST which thereupon closes contacts ST2 providing a holding circuit for the start relay in its fully operated position through normally closed contacts OF1, normally closed switch 17, and the operated start switch 14.

The full operation of the start relay ST closes contacts ST3 to complete a pulsing circuit for the minor switch motor magnet MX from the —48 volt conductor 15 in series with the pulsing contacts PL2, operated contacts ST3, and normally closed contacts FR1 of the fire relay FR that is connected in series with the anode circuit of the gas tube 10. At the same time, the start relay contacts ST4 are closed to complete the anode circuit for the gas tube 10 from the B+ conductor 20, through the fire relay FR and anode resistance 21 to the anode electrode 11 of the gas tube 10, and from the cathode electrode 13 through the normally closed differential relay contacts DY1 and operated start relay contacts ST4 to the B— conductor 18. It should be noted that the FR relay is not operated at this time since the gas tube 10 should not fire with the particular value of voltage applied across the anode and cathode electrodes 11 and 13, respectively, in the absence of a firing voltage to the starting anode 12. If the tube should fire immediately, which, of course, indicates a defective tube, contacts FR1 would be operated and opened due to the energization of the fire relay FR and therefore the stepping of the minor switch would be immediately halted since the circuit to the stepping magnet MX is then opened. In addition, if the minor switch should have stepped off-normal, the minor switch release magnet MZ would be operated due to the closure of minor switch off-normal contacts MS1 and the closure of the fire relay contacts FR2, establishing a circuit for the release magnet MZ from the —48 volt conductor 15 to the +48 volt conductor 18.

Assuming for purposes of the present description that the tube to be tested is a normally good tube, the stepping operation of the minor switch motor MX continues to move the minor switch contact arms 25, 26, and 27 in the direction of the arrows across their respective bank contacts. At this point in the operation of the circuit to be described, a static test is first to be made of the gas tube and therefore the differential relays DY and DS are not yet operated. With the DY relay not operated, contacts DY2 are in their normally closed position so that a progressively increasing voltage from the B+ conductor 20, through resistor 30 and the minor switch contact resistance bank generally shown at 31, and through the minor switch contact arm 25, and normally closed contacts DY2 is connected through load resistor 32 to the starting anode electrode 12 of the gas tube under test. A bleeder resistor 33 is also provided, as may be conventional. It may also be noted that the starting anode 12 of the gas tube 10 is also connected through a condenser 34 to a second resistance network including the resistors 35, 36, and pulsing contact PL3 of the pulsing relay PL to the normally open contact DY3 of the differential relay DY, which at this time is not operated so that such second starting anode network is not effectively in the starting anode circuit at this time.

The stepping movement of the minor switch contact arm 25, as previously described, is effective to apply a progressively increasing firing voltage as developed across the voltage divider connected across the B+ conductor 20 and the B— conductor 18, and consisting of the resistance 30, the minor switch bank resistances 31, and the resistance 40 connected through the now closed start relay contacts ST5. At the same time, the minor switch armature 27, which is moved in unison with the minor switch stepping arms 25 and 26, establishes circuits with respective ones of the indicator lamps 41–50 as the switch is stepped. For example, a typical circuit for illuminating lamp 45 may be traced from the —48 volt conductor 15 through conductor 51, lamp 45, minor switch contact 52, minor switch contact arm 27, and conductor 53 to the +48 volt conductor 18. The first three lamps 41–43 may be colored red, while the next four lamps 44–47 may be colored white, while the last three lamps 48–50 may also be colored red. As previously described, the minor switch will continue to step until the gas tube 10 under test fires so that if the minor switch steps out to a position to illuminate any of the white lamps 44–47 at the time the tube fires, the tube may be considered satisfactory for the particular test purposes. If, however, the tube fires too soon so that only one of the red lamps 41–43 is illuminated before the minor switch is released, or if the tube fires too late so that one of the red lamps 48–50 is illuminated before the minor switch is released, such illumination of a red lamp at the time that the switch is released would be indicative of defective test response by the tube.

Again assuming that the tube under test is a normally good tube, the tube will fire at some one of the minor switch mid-range positions during which any one of the white lamps 41–47 would be illuminated. When the tube fires, the fire relay FR is energized, which opens fire relay contacts FR1, as previously mentioned, to open the pulsing circuit to the minor switch motor magnet MX. At the same time, fire relay contacts FR2 are closed and since the minor switch off-normal contacts MS1 are also closed, an operating circuit for the minor switch release magnet MZ is completed. Thereupon the minor switch releases to restore its armatures 25, 26, and 27 to the normal position shown thereby removing the firing voltage as previously connected through the normal contacts DY2 and the resistance 32 to the starting anode electrode 12 of the gas tube 10. As soon as the minor switch returns to normal, a circuit is completed for operating the differential relay DY, as will be described below. Both the differential relays DY and DS are of the type that will not operate when neither or both of their coils are differentially energized. If only one of the differential relay coils is energized, the differential relay will operate. Considering now the differential relay DY, with the gas tube fired and the minor switch returned to normal, a circuit is completed to energize the DY relay coil 60 from the —48 volt conductor 15 through normally closed contacts DY4, operated fire relay contacts FR3, normally closed off-normal contacts MS2, and operated start relay contacts ST6. The second differential coil 61 of the DY relay is not energized at this time since its energizing circuit is opened at the then open contacts DS1 of the DS relay. Since only the winding 60 of the differential relay DY is energized, the differential relay DY operates to open contacts DY4 and close contacts DY5 establishing a holding circuit for the differential relay DY exclusive of the contacts FR3 of the fire relay.

The aforesaid operation of the DY relay is effective to apply the deionization test to the gas tube 10 by opening contacts DY1 and closing contacts DY6. Contacts DY1 and DY6 are of the break-before-make type such that normally closed DY1 contacts will open before normally open contacts DY6 will close. Similarly, for reasons which will be later explained, the DY6 contact, once operated, will break and open before the DY1 contact, once operated, will restore and make. It is during the operating interval of the relay contacts DY1 and DY6 that the anode circuit for the gas tube 10 is momentarily interrupted, during which time the gas tube should deionize if it is a normally good tube. If the gas tube should not deionize within this interval, the fire relay FR will again operate to open the pulsing circuit for the minor switch motor magnet MX at open contacts FR1 and thus prevent any further continuation of the testing operations to be described.

Assuming that the gas tube under test has a normal deionization response time, the gas tube 10 will deionize and become non-conductive causing the fire relay FR to restore thereby opening contacts FR2 and FR3 and reclosing contacts FR1 to again start the pulsing operation of the minor switch motor magnet MX. It should be pointed out that the differential relay DS was not at first operated at the time that the differential relay DY was operated since both of its operating coils 62 and 63 were energized through the following traced circuits. Operating coil 62 was energized through a circuit from the —48 volt conductor 15, normal contacts DS2, operated contacts FR3, minor switch off-normal contacts MS2, and operated contacts ST6. At the same time, the differential relay DS coil 63 was energized from the —48 volt conductor 15 through normal contacts DY4, operated contacts FR3, minor switch off-normal contacts MS2, and start relay contacts ST6. When the DY relay operated, the circuit for the operating coil 63 of the differential relay DS was transferred through operated contacts DY5 and the operated contacts ST6 to the conductor 18. Now, assuming the tube 10 has deionized, the fire relay FR will restore to reopen contacts FR3, thus opening the previously traced circuit for energizing coil 62 of the DS relay, thus leaving only the coil 63 of the DS relay energized and causing the differential relay DS to operate. Therefore, at the beginning of the second, or dynamic, test of the gas tube, both the DY and DS relays are operated, assuming that the gas tube 10 had properly deionized during the deionization test interval.

The minor switch then again steps in response to the pulsing of the motor magnet MX to move the stepping arms 25—27 over the rows of minor switch bank contacts and with the DY relay operated, contacts DY2 will be open and contacts DY7 will be closed so that the progressively increasing voltage applied to the starting anode 12, through the resistance network including resistors 32 and 33, will be supplied from the minor switch armature 26 and the resistance bank contacts including resistor 70, switch contact bank resistors generally shown at 71, and resistance 72. At the same time, with the differential relay DY operated, contacts DY3 are closed thereby establishing a pulsing voltage source through pulsing contacts PL3 and resistors 36 and 35 to the condenser 34 and the starting anode 12 of the gas tube 10. Thus a dynamic test is made since the progressively increasing voltage from the minor switch armature 26 through operated contacts DY7 and resistor 32 is connected to the starting anode 12 simultaneously with the pulsing voltage connected by condenser 34 from the pulse voltage network resistors 35, 36, and previously traced contacts PL3 and DY3. If the dynamic response of the gas tube 10 is normal, the gas tube will again fire when the minor switch has been stepped to a position where any one of the white lights 44—47 would be illuminated. If the tube does not have the correct characteristics, the tube will fire with the switch in a position corresponding to the illumination of either the red lights 41—43 or the red lights 48—50, as previously described in connection with the performance of the circuit when making the static condition test of the tube.

When the tube fires at this stage in the testing procedure, the fire relay FR is again operated to open contacts FR1 and close contacts FR2 for opening the minor switch pulsing circuit and closing the minor switch release circuit, as previously described. Also at the same time, since the differential relay DS was operated during this test so that the DS1 contacts are closed, the differential relay DY will then restore since with the closure of the fire relay contacts FR3 and the previously mentioned closure of contacts DS1, both the differential relay windings 60 and 61 of relay DY will be energized, thus restoring the relay DY to an unoperated condition. The restoration of the differential relay DY again opens contacts DY6 and closes contacts DY1 which, during such operation of the contacts, momentarily interrupts the anode circuit to the gas tube 10, as previously described, thereby again testing the deionization response time of the tube. Assuming the tube to have deionized during this deionization test interval, the fire relay FR will restore to open contacts FR3 thereby opening the previously traced energizing circuit for the coil 63 of the DS relay, thus causing the DS relay to restore.

It will now be observed that the minor switch has been restored to normal, that the differential relays DY and DS have been restored, and that the gas tube 10 has again deionized so that a circuit is again completed to energize the minor switch motor magnet MX and repeat the first described static test of the tube. All of the previously described tests of the tubes then continue in sequence so long as the tube continues to deionize within the required deionization test intervals, it being understood that the operation of the differential relays DY and DS causes successive tests of the gas tube to alternate between the static test and the dynamic test with deionization tests during the interval of changeover between static and dynamic tests, respectively.

In order to indicate which test is being made at any given moment, signal lamps 80 and 81 may be provided. The static signal lamp 80 is illuminated during the time that the differential relay DY is not operated through a circuit including the normally closed contacts DY8. Alternately, the dynamic signal lamp 81 is illuminated during the time that the DY relay is operated through a circuit including the operated and then closed contacts DY9.

In the event that the gas tube 10 under test does not fire at all under a particular test of either static or dynamic type, the minor switch will be stepped to the final or tenth position at which time a circuit for energizing the overflow relay OF will be established from the +48 volt conductor 18 through the conductor 53, minor switch armature 27, conductor 82, and overflow relay winding OF to the —48 volt conductor 15. The operation of the overflow relay OF closes contacts OF2 to establish a holding circuit for the overflow relay OF through the minor switch off-normal contacts MS1 and operated contacts OF3 to the +48 volt conductor 18. A release circuit for the minor switch release magnet MZ is also established through the minor switch off-normal contacts MS1 and the overflow relay contacts OF3 so that the switch restores to normal following which the MS1 off-normal contacts are opened to open the circuit to the minor switch magnet MZ and also open the holding circuit for the overflow relay OF, as previously described. The previously described operation of the overflow relay OF also opens contacts OF1 to open the holding circuit for the start relay ST which thereupon restores to stop any further tests from proceeding until the switch returns to normal.

In the event that it is desired to interrupt the test at any time and reset the circuit to normal, the normally closed reset switch 17 may be opened to open the holding circuit for the start relay ST thereby restoring the start relay to reclose the normally closed contacts ST7. If the minor switch were off-normal at the moment that the reset switch 17 was opened, the restoring of the start relay ST to close contacts ST7 would complete an operating circuit for the minor switch release magnet MZ through minor switch off-normal contacts MS1 and normally closed contacts ST7, thus restoring the minor switch to normal. Of course, the restoration of the start relay ST also opens the pulsing circuit for the pulse relay PL1 at then opened contacts ST1, opens the holding circuit for the start relay ST at then opened contacts ST2, and opens the anode circuit for the gas tube 10 at then opened contacts ST4. Contacts ST5 and ST6 are also opened to open the firing anode voltage circuits and also assure the restoration of the differential relays DY and DS if they should be operated at that time.

In the foregoing circuit, as described, colored signal lamps 41–50 were utilized to indicate the relative values of the starting anode voltage as it is progressively increased and applied to the starting anode circuit of the gas tube under test. It should be understood, of course, that the other types of indicating circuits employing meters or the like may be used and that it is not absolutely necessary to indicate the variations of the starting anode voltage as it is increased in order to successfully test the gas tube. For example, an arrangement to indicate the particular value of the starting anode voltage at the moment that the tube fires would be entirely satisfactory to indicate the static or dynamic response characteristics of the gas tube.

Various modifications may be made within the spirit of the invention and the scope of the appended claims.

What is claimed is:

1. The method of testing a gas tube of the type having at least anode, starting anode and cathode electrodes which includes the steps of applying a first source of voltage to the anode circuit of the tube, determining the static response condition of the tube by applying a progressively increasing firing voltage to the starting anode circuit of the tube until the tube fires, determining the deionization response condition of the tube by removing for a known period of time and reapplying at the expiration of the known period of time the first source of voltage to the anode circuit of the tube, and determining the dynamic response condition of the tube by applying a progressively increasing firing voltage together with intermittent superimposed voltage pulses to the starting anode circuit of the tube until the tube fires if the tube has previously deionized during the deionization test.

2. The method of testing a gas tube of the type having at least anode, starting anode and cathode electrodes which includes the steps of applying a first source of voltage to the anode circuit of the tube, determining the static response condition of the tube by applying a first progressively increasing firing voltage to the starting anode circuit of the tube until the tube fires, indicating the value of said first progressively increasing voltage, determining the deionization response condition of the tube by removing for a known period of time and reapplying at the expiration of the known period of time the first source of voltage to the anode circuit of the tube, determining the dynamic response condition of the tube by applying a second progressively increasing firing voltage together with intermittent superimposed voltage pulses to the starting anode circuit of the tube until the tube fires if the tube has previously deionized during the deionization test, and indicating the value of said second progressively increasing voltage.

3. The method of testing a gas tube of the type having at least anode, starting anode and cathode electrodes which includes the steps of applying a first source of voltage to the anode circuit of the tube, determining the static response condition of the tube by applying a first progressively increasing firing voltage to the starting anode circuit of the tube until the tube fires, indicating the value of said first progressively increasing voltage at the time the tube fires, determining the deionization response condition of the tube by removing for a known period of time and reapplying at the expiration of the known period of time the first source of voltage to the anode circuit of the tube, determining the dynamic response condition of the tube by applying a second progressively increasing firing voltage together with intermittent superimposed voltage pulses to the starting anode circuit of the tube until the tube fires if the tube has previously deionized during the deionization test, and indicating the value of said second progressively increasing voltage at the time the tube fires.

4. The method of testing a gas tube of the type having at least anode, starting anode and cathode electrodes which includes the steps of applying a first source of voltage to the anode circuit of the tube, determining the response condition of the tube by applying a progressively increasing firing voltage to the starting anode circuit of the tube until the tube fires, decreasing said firing voltage in response to the firing of said tube, and determining the deionization response condition of the tube by removing for a known period of time which is sufficient for a good tube to deionize but is insufficient for a defective tube to deionize and reapplying at the expiration of the known period of time the first source of voltage to the anode circuit of the tube.

5. The method of testing a gas tube of the type having at least anode, starting anode and cathode electrodes which includes the steps of applying a first source of voltage to the anode circuit of the tube, determining the response condition of the tube by applying a first progressively increasing firing voltage to the starting anode circuit of the tube until the tube fires, indicating the value of said first progressively increasing voltage, decreasing said firing voltage in response to the firing of said tube, and determining the deionization response condition of the tube by removing for a known period of time which is sufficient for a good tube to deionize but is insufficient for a defective tube to deionize and reapplying at the expiration of the known period of time the first source of voltage to the anode circuit of the tube.

6. In combination with a gas tube to be tested, said gas tube having at least anode, starting anode and cathode electrodes, the testing circuit including means connecting a first source of voltage in the anode circuit of said tube, first static test means to be operated to connect a progressively increasing firing voltage in the starting anode circuit of said tube, means to operate said first static test means, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the operation of said second test means to thereafter connect a progressively increasing firing voltage together with superimposed voltage pulses in the starting anode circuit of said tube, and means connected in the anode circuit and responsive to the firing of said tube to discontinue operation of said third dynamic test means.

7. In combination with a gas tube to be tested, said gas tube having at least anode, starting anode and cathode electrodes, the testing circuit including means connecting a first source of voltage in the anode circuit of said tube, first static test means to be operated to connect a first progressively increasing firing voltage in the starting anode circuit of said tube, means to operate said first static test means, means to indicate the value of said first progressively increasing voltage, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the operation of said second test means to thereafter connect a second progressively increasing firing voltage together with superimposed voltage pulses in the starting anode circuit of said tube, means to indicate the value of said second progressively increasing voltage, and means connected in the anode circuit and responsive to the firing of said tube to discontinue operation of said third dynamic test means.

8. In combination with a gas tube to be tested, said gas tube having at least anode, starting anode and cathode electrodes, the testing circuit including means connecting a first source of voltage in the anode circuit of said tube, first static test means to be operated to connect a progressively increasing firing voltage in the starting anode circuit of said tube, means to operate said first static test means, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the operation of said second test means to thereafter connect a progressively increasing firing voltage together with superimposed voltage pulses in the starting anode circuit of said tube, means connected in the anode circuit and responsive to the firing of said tube to discontinue operation of said third dynamic test means, and means to indicate the operation of either said first or said second test means.

9. In combination with a gas tube to be tested, said gas tube having at least anode, starting anode and cathode electrodes, the testing circuit including means connecting a first source of voltage in the anode circuit of said tube, first static test means to be operated to connect a first progressively increasing firing voltage in the starting anode circuit of said tube, means to operate said first static test means, means to indicate the value of said first progressively increasing voltage, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the operation of said second test means to thereafter connect a second progressively increasing firing voltage together with superimposed voltage pulses in the starting anode circuit of said tube, means to indicate the value of said second progressively increasing voltage, means connected in the anode circuit and responsive to the firing of said tube to discontinue operation of said third dynamic test means, and means to indicate the operation of either said first or said second test means.

10. In combination with a gas tube to be tested, said gas tube having at least anode, starting anode and cathode electrodes, the testing circuit including means connecting a first source of voltage in the anode circuit of said tube, first static test means to be operated to connect a progressively increasing firing voltage in the starting anode circuit of said tube, means to operate said first static test means, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the aforesaid operation of said second test means to thereafter connect a progressively increasing firing voltage together with superimposed voltage pulses in the starting anode circuit of said tube, means connected in the anode circuit and responsive to the firing of said tube to discontinue operation of said third dynamic test means, means operative in response to firing of said tube during operation of said third test means to thereafter reoperate said second deionization test means, and means operative in response to deionization of said tube following the aforesaid reoperation of said second test means to continue to reoperate said first test means and thereafter said second and third test means in the aforesaid sequence until removal of said tube from the testing circuit.

11. In combination with a gas tube to be tested, said gas tube having at least anode, starting anode and cathode electrodes, the testing circuit including means connecting a first source of voltage in the anode circuit of said tube, first static test means to be operated to connect a first progressively increasing firing voltage in the starting anode circuit of said tube, means to operate said first static test means, means to indicate the value of said first progressively increasing voltage, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the aforesaid operation of said second test means to thereafter connect a second progressively increasing firing voltage together with superimposed voltage pulses in the starting anode circuit of said tube, means to indicate the value of said second progressively increasing voltage, means conected in the anode circuit and responsive to the firing of said tube to discontinue operaiton of said third dynamic test means, means operative in response to firing of said tube during operation of said third test means to thereafter reoperate said second deionization test means, and means operative in response to deionization of said tube following the aforesaid reoperation of said second test means to continue to reoperate said first test means and thereafter said second and third test means in the aforesaid sequence until removal of said tube from the testing circuit.

12. In combination with a gas tube to be tested, said gas tube having at least anode, starting anode and cathode electrodes, the testing circuit including means connecting a first source of voltage in the anode circuit of said tube, first static test means to be operated to connect a progressively increasing firing voltage in the starting anode circuit of said tube, means to operate said first static test means, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the aforesaid operation of said second test means to thereafter connect a progressively increasing firing voltage together with superimposed voltage pulses in the starting anode circuit of said tube, means connected in the anode circuit and responsive to the firing of said tube to discontinue operation of said third dynamic test means, means to indicate the operation of either said first or said second test means, means operative in response to firing of said tube during operation of said third test means to thereafter reoperate said second deionization test means, and means operative in response to deionization of said tube following the aforesaid reoperation of said second test means to continue to reoperate said first test means and thereafter said second and third test means in the aforesaid sequence until removal of said tube from the testing circuit.

13. In combination with a gas tube to be tested, said gas tube having at least anode, starting anode and cathode electrodes, the testing circuit including means connecting a first source of voltage in the anode circuit of said tube, first static test means to be operated to connect a first progressively increasing firing voltage in the starting anode circuit of said tube, means to operate said first static test means, means to indicate the value of said first progressively increasing voltage, means connected in the anode circuit and responsive to the firing of said tube to discontinue operation of said first static test means, second test means operative in response to the firing of said tube to momentarily disconnect for a determined period of time and immediately thereafter reconnect said first source of voltage in the anode circuit of said tube to determine the deionization response of the tube, third dynamic test means operative only in response to deionization of said tube following the aforesaid operation of said second test means to thereafter connect a second progressively increasing firing voltage together with superimposed voltage pulses in the starting anode circuit of said tube, means to indicate the value of said second progressively increasing voltage, means connected in the anode circuit and responsive to the firing of said tube to discontinue operation of said third dynamic test means, means to indicate the operation of either said first or said second test means, means operative in response to firing of said tube during operation of said third test means to thereafter reoperate said second deionization test means, and means operative in response to deionization of said tube following the aforesaid reoperation of said second test means to continue to reoperate said first test means and thereafter said second and third test means in the aforesaid sequence until removal of said tube from the testing circuit.

14. The method of testing a gas tube of the type having at least anode, starting anode and cathode electrodes which includes the first step of applying a first source of voltage to the anode circuit of the tube, determining the static response condition of the tube by applying a progressively increasing firing voltage to the starting anode circuit of the tube until the tube fires, the second step of determining the deionization response condition of the tube by removing for a known period of time and reapplying at the expiration of the known period of time the first source of voltage to the anode circuit of the tube, the third step of determining the dynamic response condition of the tube by applying a second progressively increasing firing voltage together with intermittent superimposed voltage pulses to the starting anode circuit of the tube until the tube fires if the tube has previously deionized during the deionization test, again determining the deionization response condition of the tube by repeating the aforesaid second method step, and thereafter continuously repeating all of the method steps in the aforesaid order to thereby determine the erratic response condition of the tube if the tube continues to deionize during each operation of the second method step.

15. The method of testing a gas tube of the type having at least anode, starting anode and cathode electrodes which includes the first step of applying a first source of voltage to the anode circuit of the tube, determining the static response condition of the tube by applying a first progressively increasing firing voltage to the starting anode circuit of the tube until the tube fires, the second step of indicating the value of said first progressively increasing voltage, the third step of determining the deionization response condition of the tube by removing for a known period of time and reapplying at the expiration of the known period of time the first source of voltage to the anode circuit of the tube, the fourth step of determining the dynamic response condition of the tube by applying a second progressively increasing firing voltage together with intermittent superimposed voltage pulses to the starting anode circuit of the tube until the tube fires if the tube has previously deionized during the deionization test, the fifth step of indicating the value of said second progressively increasing voltage, again determining the deionization response condition of the tube by repeating the aforesaid third method step, and thereafter continuously repeating all of the method steps in the aforesaid order to thereby determine the erratic response condition of the tube if the tube continues to deionize during each operation of the third method step.

References Cited in the file of this patent

UNITED STATES PATENTS 2,088,317   Bachelet _____ July 27, 1937